Sept. 26, 1933.  W. A. MORTON  1,928,599
GLASS BLOWING MACHINE
Filed Feb. 3, 1930  10 Sheets-Sheet 4

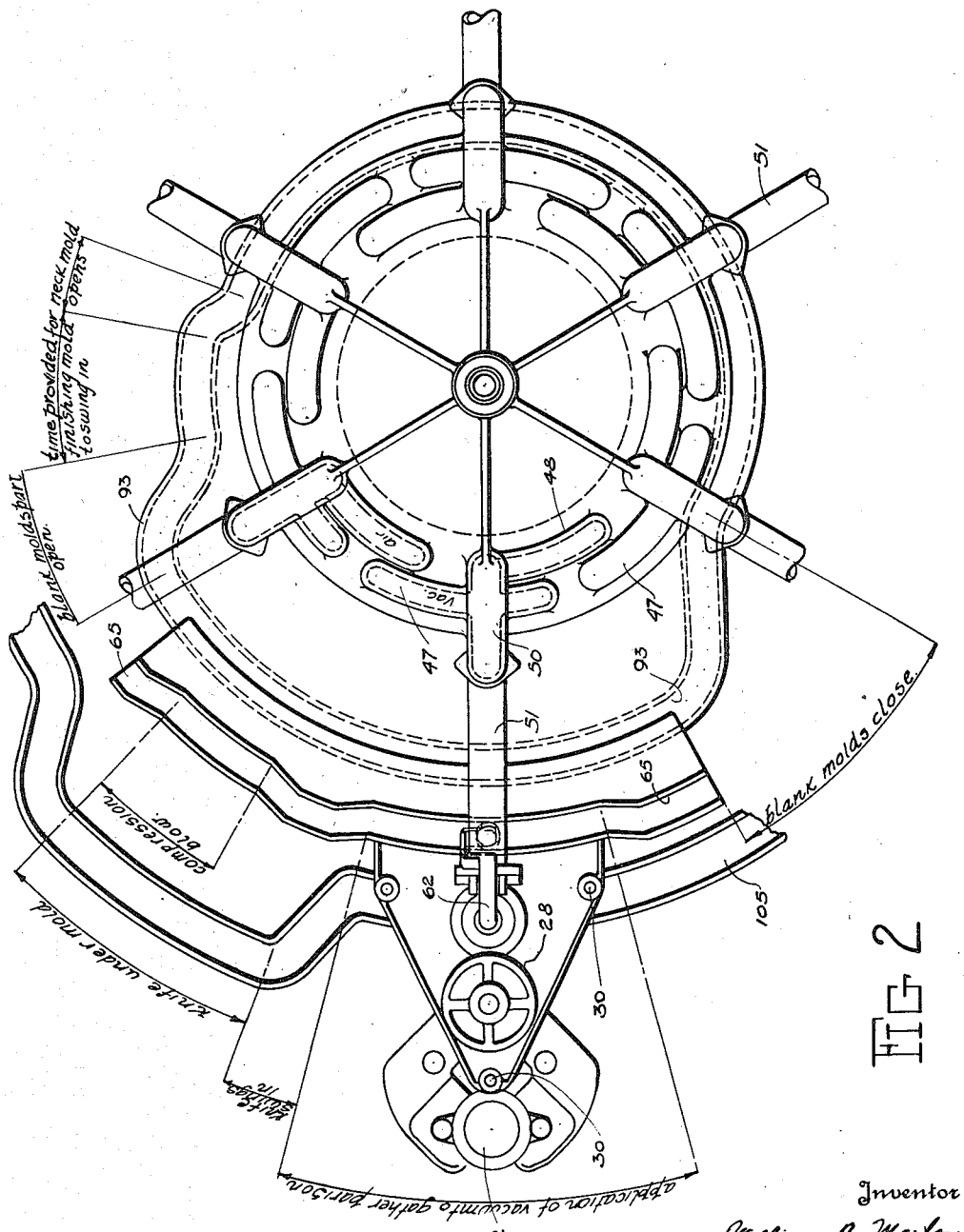

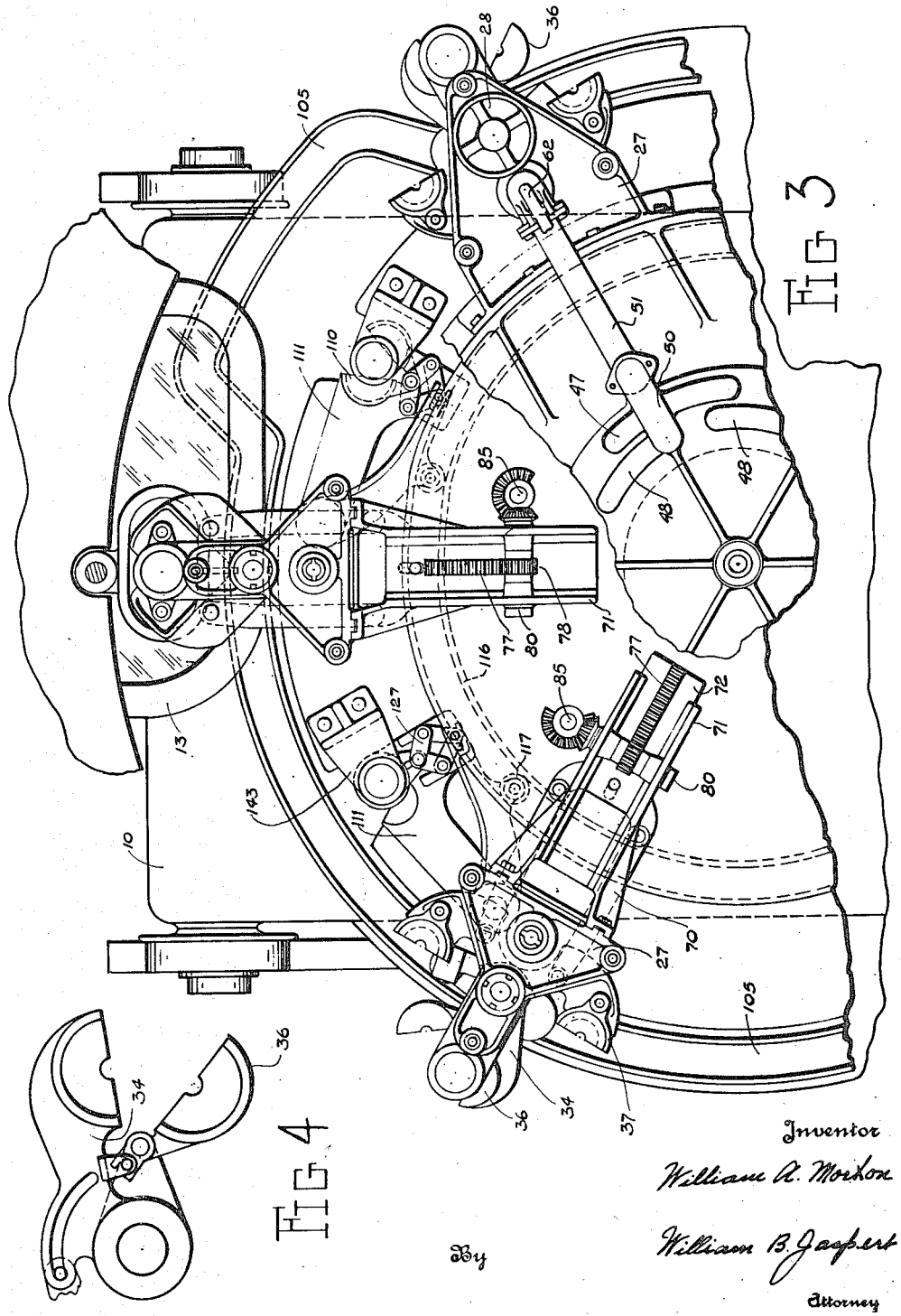

Inventor
William A. Morton
William B. Jaspert
By
Attorney

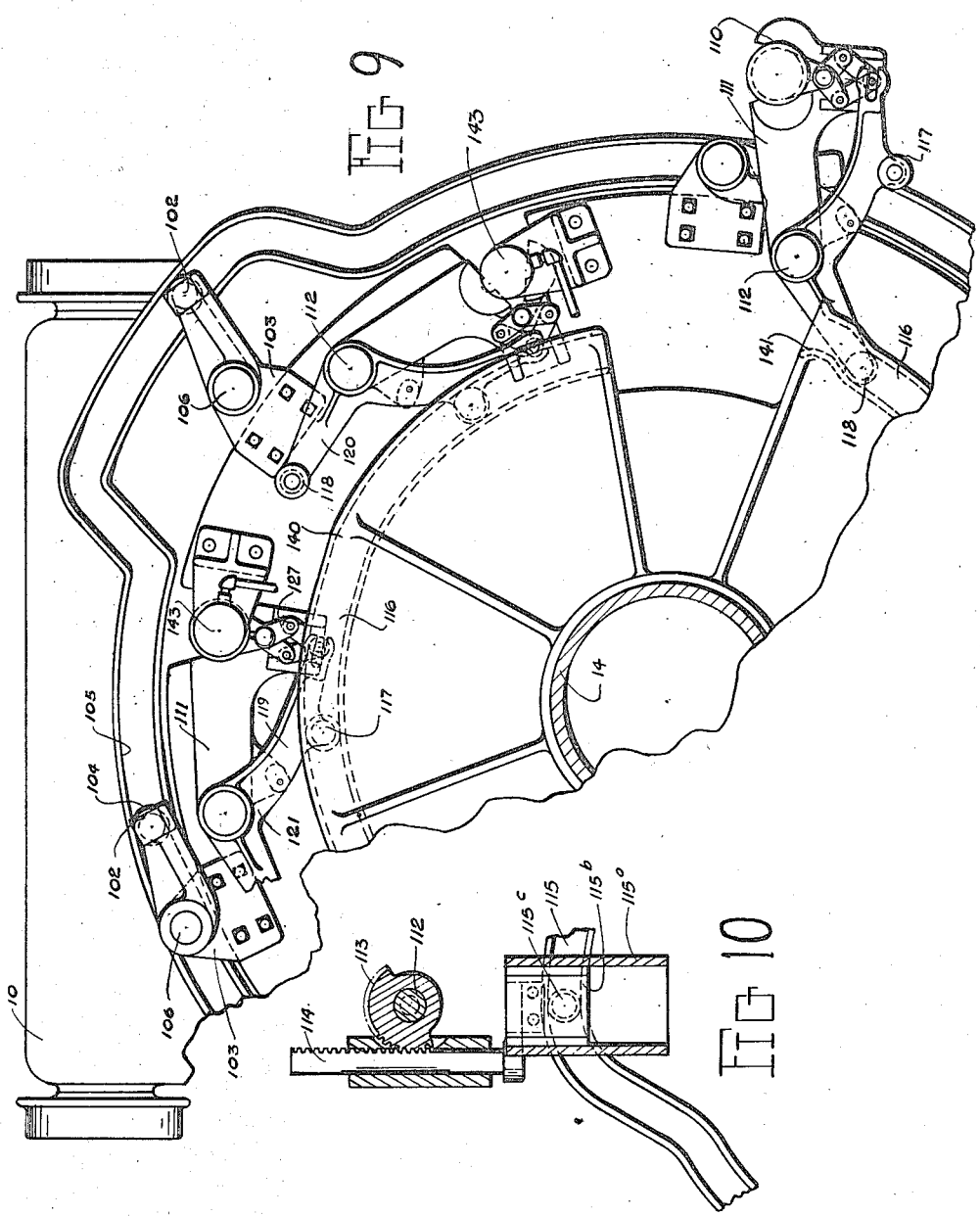

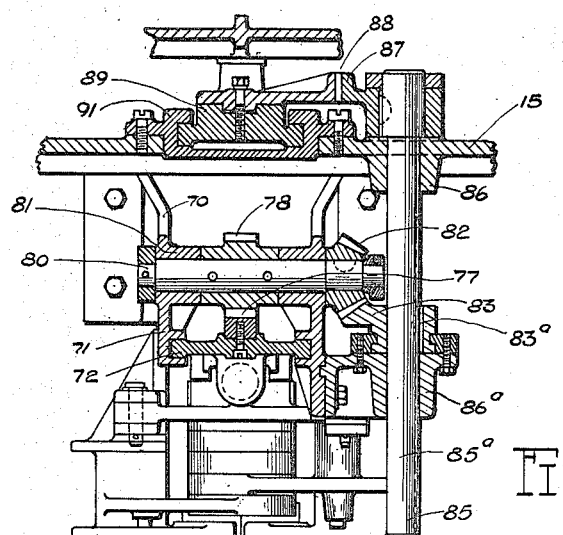
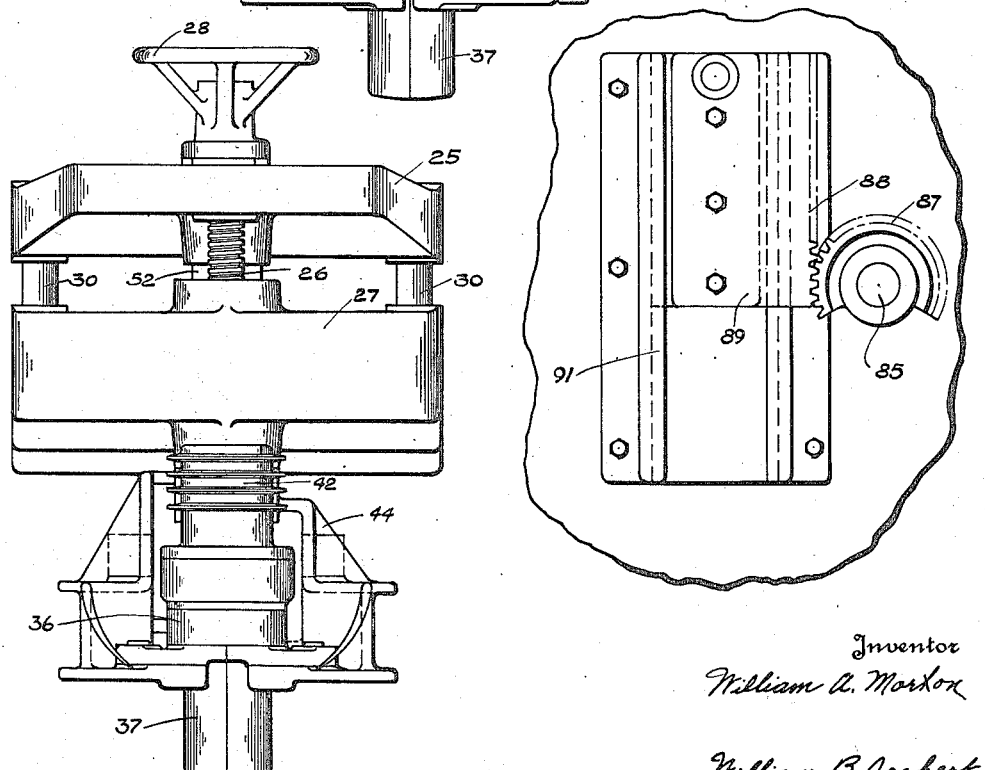

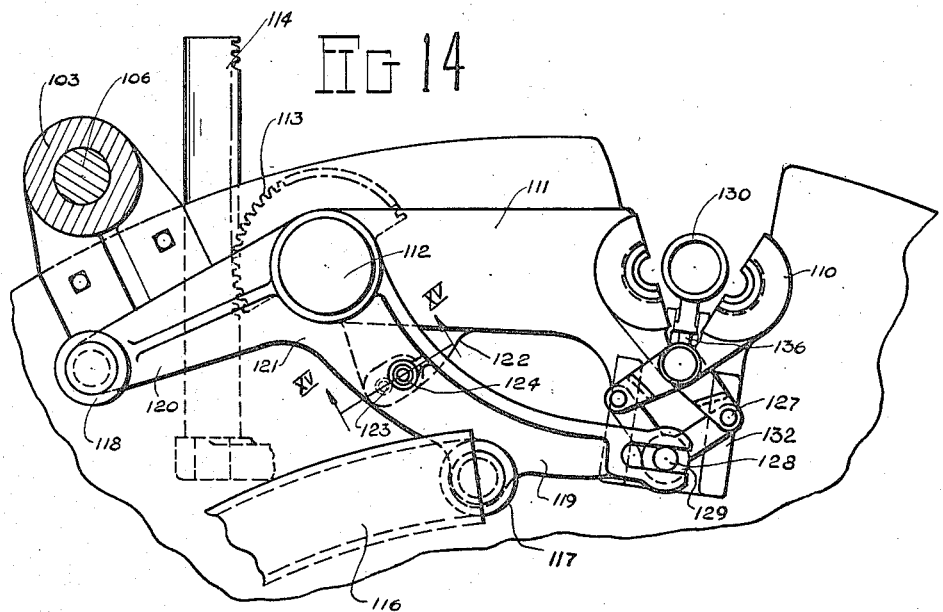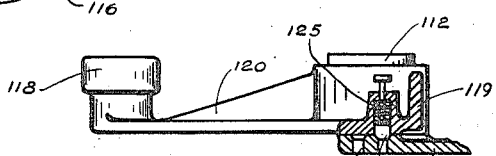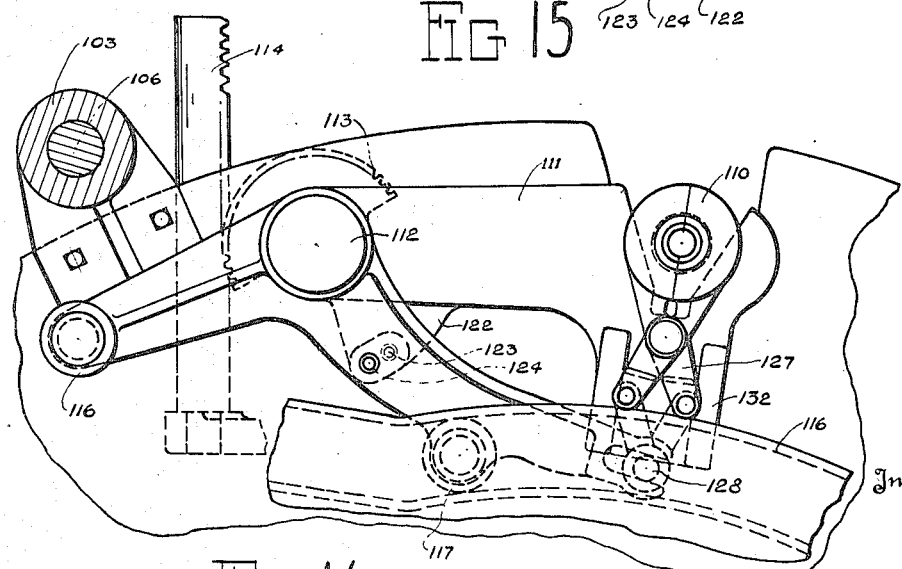

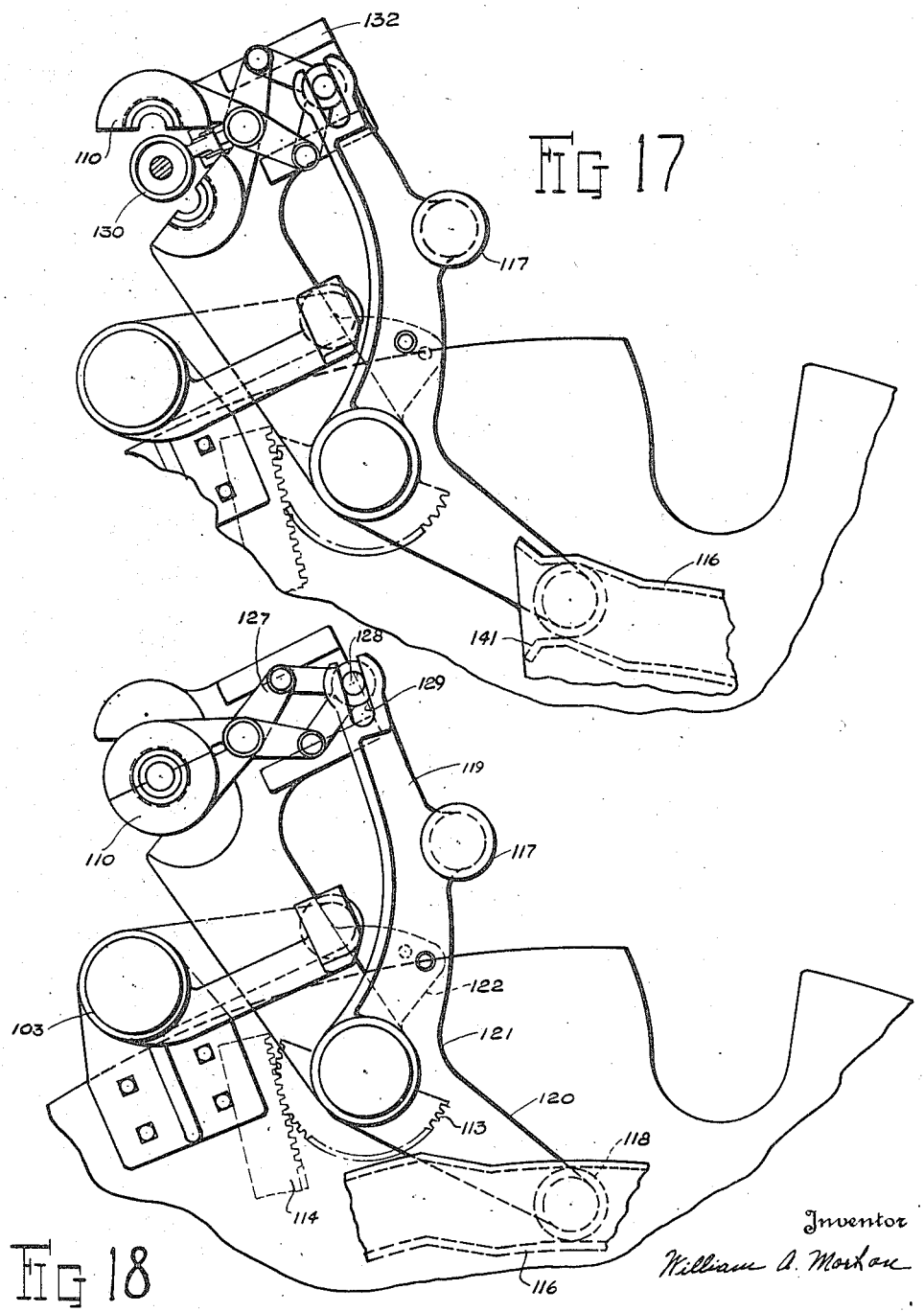

Sept. 26, 1933.  W. A. MORTON  1,928,599
GLASS BLOWING MACHINE
Filed Feb. 3, 1930  10 Sheets-Sheet 9
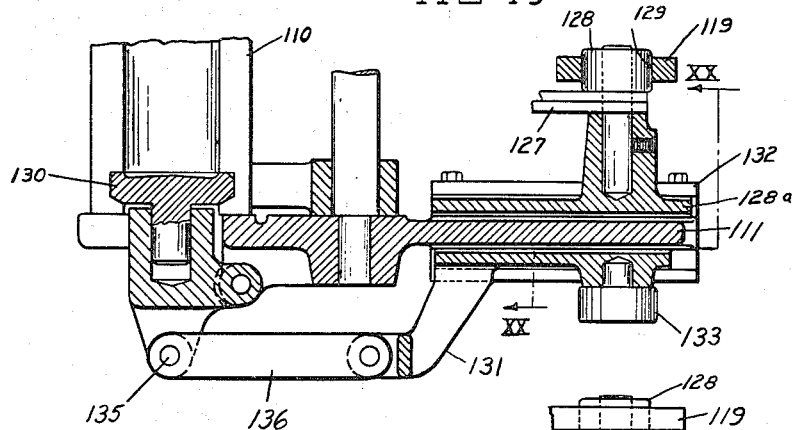
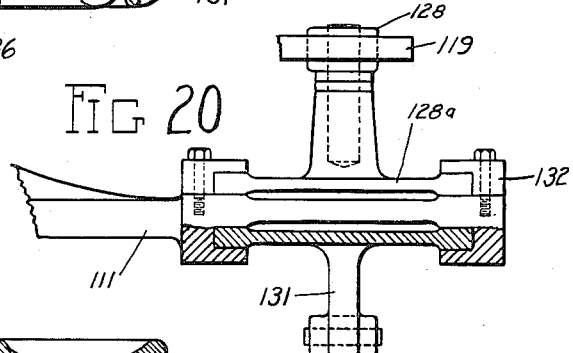
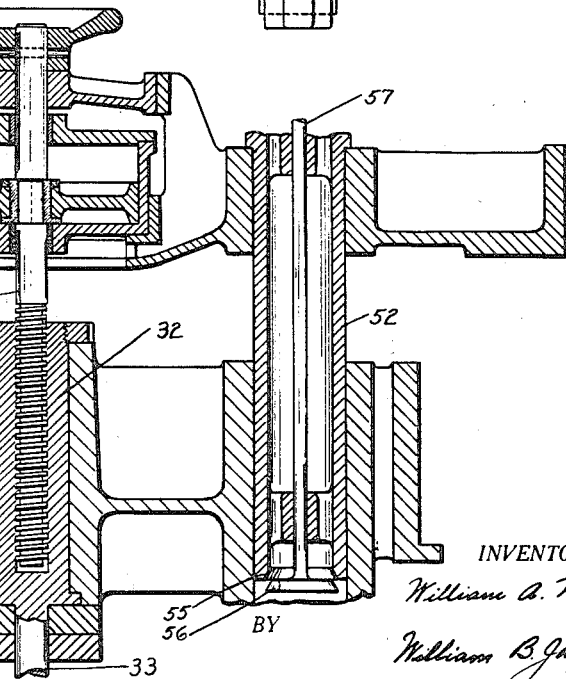
INVENTOR.
William A. Morton
BY William B. Jaspert
ATTORNEY.

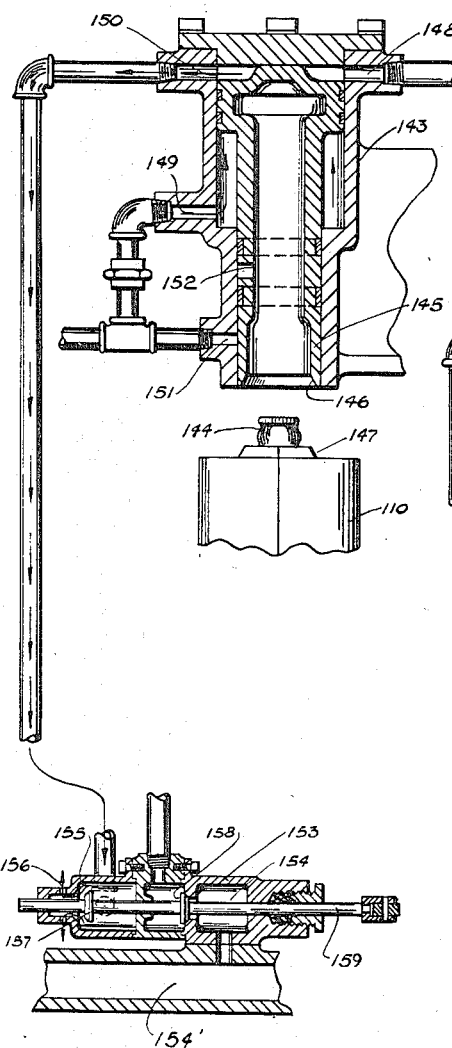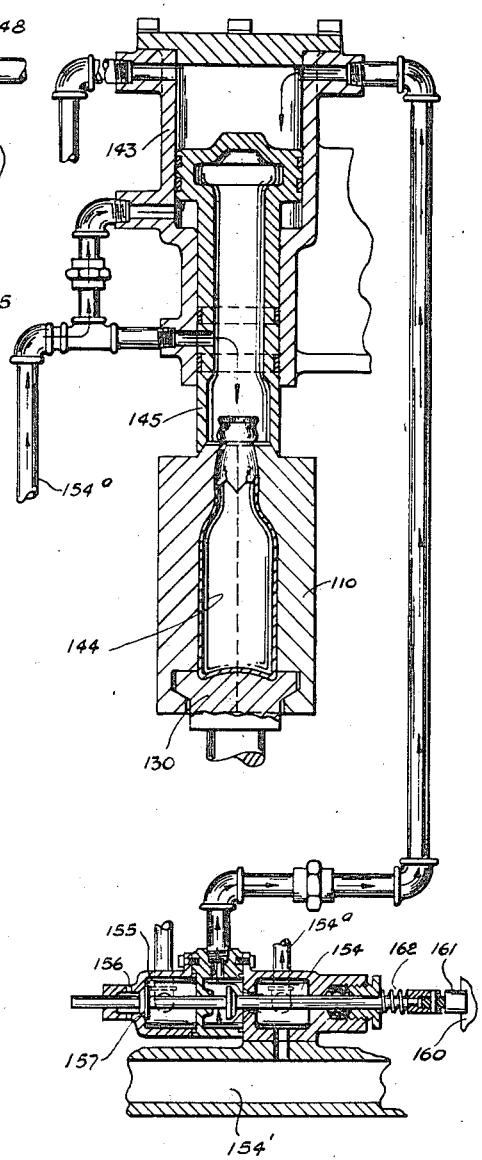

Patented Sept. 26, 1933

1,928,599

UNITED STATES PATENT OFFICE 1,928,599

GLASS BLOWING MACHINE

William A. Morton, Pittsburgh, Pa., assignor to American Glass Machine Corporation, Pittsburgh, Pa., a corporation of Delaware Application February 3, 1930. Serial No. 425,382

12 Claims. (Cl. 49—5)

This invention relates to glass blowing machines of the continuous type for gathering glass by suction and forming and blowing the same into articles of finished form.

In one type of machines heretofore known and used, it has been the practice to gather the glass by presenting the mold at or in a glass pool, especially by dipping the mold into the glass and creating a vacuum, causing the mold to fill, such machines being known as the suction feed type.

Objects of the invention

It is among the objects of this invention to provide a machine of the suction feed type which shall not require the usual dipping action of the blank mold, as heretofore practiced, although the machine may be modified to function in this manner.

Another object of the invention is the provision of means whereby the seam made by the joint of the blank mold is practically eliminated in the final blowing operation when the parison is expanded in the finishing mold.

A further object of the invention is the provision of means for continuing the final blowing operation through a longer period than is possible in machines heretofore employed, thereby permitting operation of the machine at extremely high speed.

A further object of the invention is the provision of a glass blowing machine in which the completed ware may be discharged from the blow molds while travelling at a peripheral speed considerably less than the speed of the blank or parison molds.

A still further object of the invention is the provision of a distributor head of the slide valve type, common to all the molds, for controlling the raising and lowering of the plunger in the blank molds, and valve mechanism controlling each individual mold head.

Views of drawings

Figure 1:
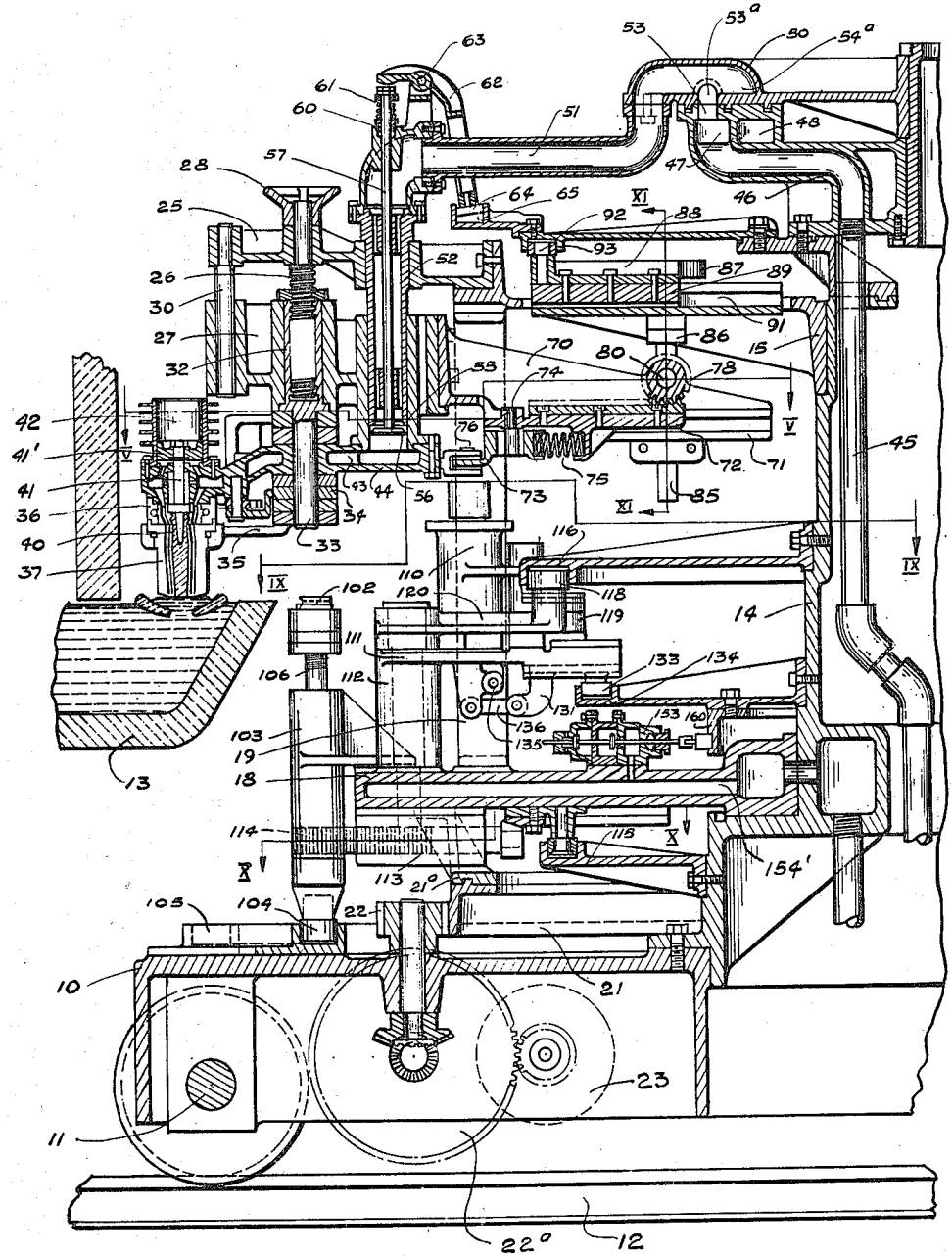
Figure 5:
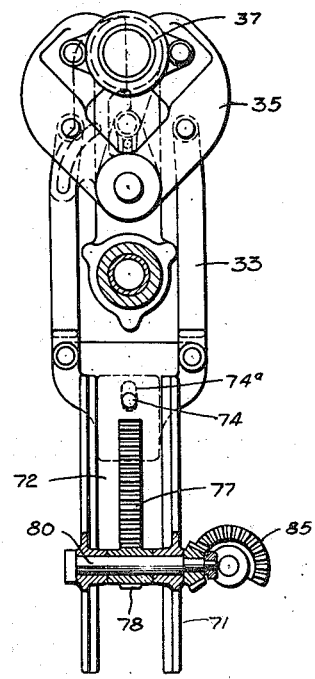
Figure 6:
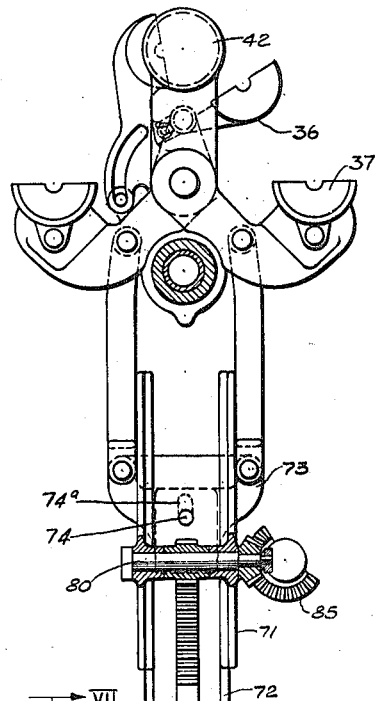
Figure 7:
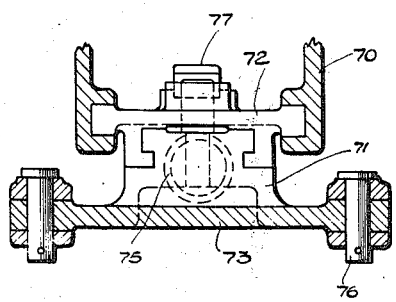
Figure 8:
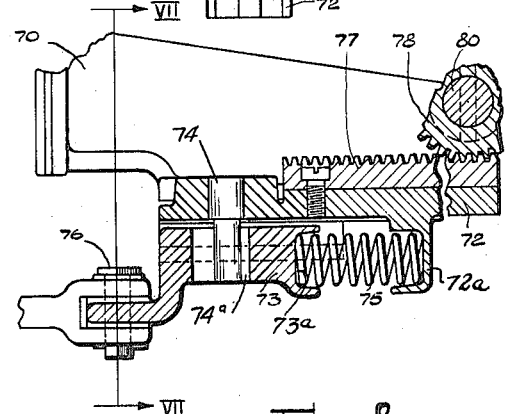

These and other objects will become more apparent from a consideration of the accompanying drawings in which like reference characters designate like parts and in which Fig. 1 is a vertical half section of a glass blowing machine embodying the principles as herein set forth; Fig. 2 a top plan view of a portion of the machine diagrammatically illustrating some of the operations of the blank, neck and finishing molds and some of their operating mechanism; Fig. 3 a partial plan view partially broken away to illustrate the relative positions of the blank and finishing molds; Fig. 4 a view illustrating the neck molds in open position; Fig. 5 a sectional elevational view on line V—V of Fig. 1, showing the blank mold and neck mold in closed position; Fig. 6 a similar view of the blank and neck molds in open position; Fig. 7 a cross-sectional view taken on line VII—VII of Fig. 8; Fig. 8 a section through the blank mold opening slide; Fig. 9 an elevational view taken on line IX—IX of Fig. 1; Fig. 10 a sectional elevation of the blow mold swinging mechanism taken on line X—X of Fig. 1; Fig. 11 a sectional elevational view along the line XI—XI of Fig. 1; Fig. 12 a top plan view of Fig. 11; Fig. 13 a front elevational view of the blank mold head; Fig. 14 a plan view of the blow mold in discharge position; Fig. 15 a sectional elevation along the line XV—XV of Fig. 14; Fig. 16 a plan view of the blow mold in blowing position; Fig. 17 a plan view of the open blow mold swung outwardly to receive the parison; Fig. 18 a plan view of the blow mold in closed position after receiving parison; Fig. 19 a sectional elevational view of the blow mold opening and closing mechanism; Fig. 20 an end elevational view taken on line XX—XX, Fig. 19; Fig. 21 a cross sectional view of the mold head illustrating the application of an air motor for dipping the blank mold; Fig. 22 a sectional elevational view of the blow head and its control valve; and Fig. 23 a similar view of the blow mold and head in cooperative relation with connections to pressure and exhaust lines.

General structure

In Fig. 1 the numeral 10 designates a base mounted on wheeled axles 11 for movement on tracks 12 to and from a working tank 13. Extending upwardly from the base 10 is a hollow vertical column 14 on which a blank mold spider 15 and a blow mold spider 18 are mounted for rotation. The spiders 15 and 18 are interconnected by uprights 19 to rotate in unison. The rotation of spiders 15 and 18 is accomplished by a ring gear 21 mounted by a bracket 21a on the lower side of the spider 18, and gear wheel 21 is driven by a pinion 22 which in turn is driven through an interconnected gear mechanism 22a by a motor 23 mounted on base 10.

Spider 15 is provided with a bearing bracket 25, Figs. 1 and 13, having an adjusting screw 26 which carries and supports a blank mold head casting 27. The screw 26 is provided with a hand wheel 28 for adjusting the head casting 27 to the various vertical positions required when various sizes of molds are used, it being a feature of this invention to adjust the machine for the use of molds of different heights simultaneously so that different sized molds may be operated together.

In Fig. 21, the mold head is shown provided with an air motor to provide for dipping the blank molds into the glass pool if desired. In this figure the bearing bracket 25 and head casting 27 are provided with rods 30 in the manner described and the adjusting screw 26 is employed as in the non-dipping mold heads. Vertical adjustment of the mold is made by the hand wheel 28. An arm 25a is provided to support the screw 26 and the latter is provided with a piston 26a that operates in a cylinder 26b. The piston is actuated to raise and lower the mold head 27 by air pressure applied through ports 27a connected by a suitable system of piping with a fluid pressure source. The head castings are retained in proper adjustment at all times by guide pins 30 which have sliding connection only with the castings 27 and are permanently secured to the brackets 25.

The screw 26 interacts with an internally screw-threaded sleeve 32, the lower end of which terminates in a hinge pin 33 upon which neck mold arms 34, Fig. 4, and blank mold arms 35 fulcrum in their opening and closing movement. The neck molds 36 are supported by the arms 34 and the blank molds 37 are supported by the arms 35. A corkage forming plunger 40 is mounted upon piston 41 of a cylinder 42 and is actuated by the application of air and vacuum through an opening 43 in the lower head casting 44.

A pipe 45 leads from a source of fluid pressure or vacuum to a distributor head 46 which is attached by the column 14 and has passages 47 and 48 provided therein for vacuum and air respectively. Head 46 is common to all of the blank molds and control of air pressure or vacuum for the individual molds is obtained through valve mechanism hereinafter described. The distributor is provided with a cap or upper portion 50 which is arranged to rotate with the machine and is designed to alternately admit air and vacuum to a conduit 51 which terminates in a sleeve or nozzle 52 that has a free sliding connection with the head 27 so that the latter may be adjusted to any desired position and maintain operable connection with the air and vacuum supply.

The distributor 46 has elongated parts 53 and 54 communicating with the passages 47 and 48 respectively and the distributor cap 50 is provided with corresponding openings 53a and 54a which act as a slide valve to control the admission of air and vacuum to the conduit 51 in predetermined order when the cap 50 is rotating. Thus the conduit 51 may be evacuated or filled with air prior to its need at the delivering or gathering point.

Air pressure or vacuum for the individual heads 27 is controlled by the following mechanism. The lower end of the sleeve 52 is provided with a valve seat 55 for cooperation with a valve 56 having a stem 57 that projects upwardly through a packing gland 60 and which is biased to its normally closed position by a spring 61. A rocker arm 62 is pivoted at 63 and carries a cam roller 64 at one end which runs in a cam path 65, Figs. 1 and 2, designed to actuate the valve 56 at the proper time to admit vacuum for the gather and air for the initial puff and for the final blow to molds 37.

The gather and neck molds 37 and 36, respectively, are operated by the following mechanism:

Attached to the rear end of the head 27 is a slide bracket 70, Figs. 1 and 3 to 8 inclusive, having guide ways 71 in which are mounted slides 72. A yoke 73 is loosely connected by a pin 74 and slot 74a to the slide 72 and a spring 75 is disposed between spring seats 72a and 73a and reacts against these seats to hold the molds closed under tension. The yoke 73 and mold arms are connected by a pin 76, and through pin 74 with the slide 72 for opening and closing the molds. A gear toothed rack 77 is provided on the upper side of slide 72 and the teeth of the rack mesh with a pinion 78 which latter is mounted on a horizontal shaft 80 adapted for rotation in bracket bearings 81, Fig. 11. Mounted upon one end of shaft 80 is a beveled gear pinion 82 that meshes with the teeth of a beveled gear 83 which is rotatably mounted on bracket 70. The beveled gear 83 has a key 83a in sliding engagement with a key way 85 of a vertical shaft 85a to provide for vertical adjustment of brackets 70 without interference with the driving connections of gear wheels 81, 82 and 83. The shaft 85a is mounted in a journal bearing 86 formed on the spider 15 and a bearing 86a, and is provided at its upper end with a gear segment 87 that meshes with a gear rack 88 attached to a cam slide 89. The cam slide is mounted in guides 91 of spider 15 and carries a cam roller 92, Fig. 1, which runs in a cam path 93. This cam path actuates the slide 89 through the mechanism just described to open and close the blank and neck molds and is designed to allow for vertical adjustment of the gathering head while the machine is in motion without interfering with its operation.

The glass tailings of the blank molds is sheared off by the following mechanism: A cut off knife generally designated at 102, Figs. 1 and 9, is mounted in a bearing bracket 103 which is attached to spider 18 and has an operating connection through a cam roller 104 with a cam path 105. Cam 105 is designed to actuate the knife to sever the tailings from the blank mold 37 by swinging about a fulcrum shaft 106 at the proper time as will be hereinafter explained.

The parisons are blown and expanded to the finished form and dimension of the ware by the following mechanism: Finishing molds 110 are carried by arms 111 which are pivoted on vertical fulcrum shafts 112, Figs. 1 and 14 to 20 inclusive. The shafts 112 are provided with pinions 113 that mesh with a horizontally disposed rack 114, the segment 113 and rack 114 constituting a driving connection with a cam 115. This cam actuates the gear segment 113 to swing the finishing molds in their proper sequence.

A cam path 116 is provided to open and close the finishing mold and for this purpose is cooperative with rollers 117 and 118 which are mounted on the arms 119 and 120, respectively, of a mold operating lever 121 which is pivoted on fulcrum 112. The arms 111 carrying the finishing molds 110 are provided with an off-set 122, Figs. 14, 15 and 16, having countersunk openings 123 adapted to interact with a plunger 124 biased by a coil spring 125 to yieldingly engage said openings. This construction locks the mold operating lever 121 in its open and closed positions. The finishing molds 110 are connected through toggles or links 127 to the arm 119 of levers 121 by a roller 128 engaging the yoke or slots 129 of arms 119. The roller 128 is mounted on a slide 128a which is movable in guides 132, Figs. 19 and 20, and which is actuated by the mold operating lever 121 to open and close the molds.

Bottom supports 130 for molds 110, Figs. 14 and 19, are operated by slides 131, Fig. 19, in the guides 132 of the mold arms 111 and the slides are actuated by rollers 133, Figs. 1, 19 and 20, which operate in a cam 134. The bottom supports 130 are pivoted at 135, Figs. 1 and 19, and are conencted by a link 136 to the slides 131.

In Fig. 9 the cam path 116 is shown interrupted to provide for the swinging of the molds 110 from their inner blowing and discharge positions to the outer positions where they receive the blanks or parisons. As shown in this view, the cam 116 is off-set at 140 at which point the blowing operation is completed and the molds are opened to discharge the finished ware. After passing over the interrupted portion of the cam, the mold swings outward and roller 118 engages cam 116 at the flanged end portion 141 at which point mold 110 closes on the parison. The blowing or expanding of the parisons is accomplished by means of a blow head and control valve consisting of the following mechanism: As shown in Figs. 21 and 22, the blow head 113 is provided for blowing the ware such as the bottle 144 which is shown in the mold 110, Fig. 22. The blow head 143 comprises a cylinder having a piston actuated plunger 145 which is provided with a chamfered end 146 of a shape complementary to the top end 147 of mold 110. Plunger 145 is actuated by the admission of fluid pressure through the passage 148 to lower it on the mold 110. It is raised by fluid pressure entering passage 149 and the cylinder is simultaneously exhausted through passage 150.

The ware is blown through passage 151 communicating with a port 152 in plunger 145 and the pressure and exhaust passages are connected through a suitable system of piping with an operating valve generally designated at 153. The valve mechanism comprises a pressure chamber 154 leading to a constant supply source 154', Fig. 1, and through pipe 154a to passages 149 and 151 and an exhaust chamber 155, the latter communicating with the atmosphere through ports 156. Valves 157 and 158 mounted on valve stem 159 respectively, control the exhaust and pressure passage leading to the blow head. Valve stem 159 is actuated by a cam 160 and is provided with a follower 161 which is biased by a spring 162 to bear against the cam surface.

Operation of blank mold

The operation of the glass blowing machine is briefly as follows: For simplicity, the operation of one blank and one finishing mold will be described, it being understood that the other molds operate in like manner.

The blank and neck molds 37 and 36, respectively, being in closed position are presented above the glass pool in tank 13, as shown in Figs. 1 and 3, and the glass is raised to contact with the mouth of blank mold 37. Preliminary to the contacting of the glass with the mold, port 53a of the distributor 46 has aligned itself with port 53 which communicates with an evacuating source. With ports 53 and 53a in alinement, the conduit 51 and sleeve 52 are evacuated and as contact of the glass and mold 37 is effected, valve 56 is actuated by lever 62 through roller 64 and cam path 65 whereby valve 56 is unseated and the blank mold 37 is evacuated through passage 43.

As the blank mold is evacuated, the differential pressure in cylinder 42 causes piston 41 to lower, thus bringing the corkage forming plunger 40 into proper position in the neck mold 36 to form the neck opening in the ware. Blank mold 37 then fills with the molten glass which is drawn into the mold by suction. The mold then moves out of contact with the glass and the cut-off knife 102 is actuated by cam roller 104 through the cam path 105 which swings knife 102 about the fulcrum shaft 106 to sever the hanging tail of glass, leaving a segregated charge or parison in the blank mold 37.

At or near this time, valve 56 is closed, shutting off communication between conduit 51 and the mold head. Immediately upon closing of valve 56, ports 53 and 53a are also closed and ports 54 and 54a leading to a source of fluid pressure are opened filling conduit 51 and sleeve 52. Valve 56 is timed by cam path 65 to open through operation of lever 62 to permit the passage of air into passage 43 and to the mold 37. This passage of air will raise piston 41 and its connected plunger 40 and simultaneously compact the glass in the mold.

The sequence of operations described are indicated by the segment arrows in Fig. 2 of the drawings as, application of vacuum to gather parison; knife swinging in; knife under mold; and compression blow. It will be seen that the time interval for the compression blow is effective when the knife is under the mold and ineffective when the knife has swung out of position from under the mold.

As will be seen in Fig. 2, the cam 65 is off-set to again close valve 56 after completion of the compression blow and at this point of the mold travel cam path 93 actuates roller 92 and its connected guide 89 to rotate the gear wheel 78 through the connected mechanism shown in Fig. 11. Gear 78 actuates the slide 72 which operates the blank and neck mold levers to initially open the blank mold leaving the parison suspended from the neck mold 36.

Operation of finishing mold

When the blank mold commences its opening movement, the finishing mold 110 starts on its horizontal outward movement as graphically shown in Fig. 2. During the swinging movement of mold 110, the mold halves are in open position and remain open until the center of finishing mold 110 aligns with the center of blank mold 37. Swinging of mold 110 is accomplished through the following mechanism: Referring to Fig. 10, cam 115 actuates gear rack 114 which through its engagement with gear segment 113 swings the mold support 111 around its fulcrum shaft 112. When the point of mold alignment has been reached, roller 118 of the mold operating lever 121 engages cam 116 to close mold 110 about the parison, through the mechanism described in connection with Figs. 14 to 20 inclusive, of the drawings, and neck mold 36 opens releasing the parison to the finishing mold.

The finishing mold with its parison is then swung inwardly to a blowing station. During the interval the finishing mold is swinging inwardly and for a predetermined time interval thereafter, the parison is reheated in the finishing mold to put its enamel formation in good condition for final expansion.

One of two methods of operation may be accomplished with this machine. In connection with the cycle of bottle forming, the preferred cycle, is to gather the parison, swing the finishing mold to the transfer point, enclose the parison in the finishing mold, then swing the parison while enclosed in the finishing mold, inwardly to a blowing station. Sufficient time is allowed for a reheating of the parison prior to the final blowing operation.

The other cycle of forming a bottle would be to gather the parison in the blank mold, swing the finishing mold outwardly to the gathering position and enclose the parison, and then by an application of air under pressure through the neck mold, set or blow the parison out to the walls of the finishing mold; thereafter the neck mold is opened and the finishing mold is swung back to its inner circle and an auxiliary or final blow is provided during the rest of the cycle of operation.

One of the features of the invention is the relative position of the mold joints during the transfer of the parison from the blank mold to the finishing mold. In connection with Figs. 3 and 9 it will be seen that the blank mold 37 maintains a fixed relation as in Fig. 3, leaving the seam of the parison in a plane radial with the rotating axis of the machine. In Fig. 9 the finishing mold 110 is swung outwardly and is in position to close on the parison. In closing, the seam of the mold will be at right angles or 90° from the seam in the parison and consequently the seam of the parison will be greatly reduced or entirely eliminated by the reheating and final blow in the finishing mold.

Another feature of the invention is the forming of the parison and the blowing of the bottle to finished form in the same horizontal plane, although as previously pointed out herein, the gathering heads are designed to be vertically movable by a dipping air motor without interfering with the other described operations of the head.

I claim:

1. In a glass forming machine the combination with a continuously rotating carriage of neck, blank and finishing molds mounted thereon and rotating in concentric parallel paths, means for horizontally swinging the finishing molds to the blank mold path through a separate circular path to bring said molds in register with the parison molds for closing said finishing molds about the parisons while travelling in the parison mold path, and means for returning said finishing molds to the finished mold path to blow the parisons to final form.

2. In a glass forming machine the combination with a continuously rotating carriage of a series of parison mold heads supported thereby, a series of arms mounted on said carriage and adapted for movement in the direction of the molds, each arm having a finishing mold, said parison and finishing molds rotating in separate concentric horizontal paths and said finishing molds in a fixed horizontal plane, a gathering position in one path, a blowing position in the other path, and means for causing said arms to swing outwardly to bring said finishing molds in the path of said parison molds and in cooperative alinement to transfer the parison, and means for adjusting the neck molds of the parison mold heads whereby they may be maintained in different horizontal planes with respect to each other to produce parisons of different lengths sequentially during a single rotation of the carriage.

3. In a glass forming machine the combination with a continuously rotating carriage, of a series of parison mold heads supported thereby, a series of arms mounted on said carriage and adapted for movement in the direction of the molds, each arm having a finishing mold, said parison and finishing molds rotating in separate concentric horizontal paths and said finishing molds in a fixed horizontal plane, a gathering position in one path, a blowing position in the other path, and means for causing said arms to swing outwardly to bring said finishing molds in the path of said parison molds and in cooperative alinement to transfer the parison, and means for adjusting and maintaining the several parison mold heads in different horizontal planes, mold operating mechanism carried by and movable with said heads, and actuating mechanism in sliding engagement with said mold operating mechanism for actuating said molds in their adjusted positions.

4. In a glass forming machine the combination with a continuously rotating carriage of a series of parison mold heads supported thereby, a series of arms mounted on said carriage and adapted for movement in the direction of the molds, each arm having a finishing mold, said parison and finishing molds rotating in separate concentric horizontal paths and said finishing molds in a fixed horizontal plane, a gathering position in one path, a blowing position in the other path, and means for causing said arms to swing outwardly to bring said molds in cooperative relation to transfer the parison from the gathering position to the final blowing position, and opening and closing mechanism for the finishing molds including means for actuating said mechanism to close said molds and independent means for opening said molds.

5. In a glass forming machine, the combination with a continuously rotating carriage supporting a series of complementary parison and finishing molds, the said molds traveling around the machine axis in different concentric circles through an arc of great length and in register through an arc of relatively short length, means for transferring the parison to the finishing molds on the short arc of travel, a charge receiving cycle for the said parison mold, a finish mold-blowing cycle for the complementary mold and means for continuing the blowing of the article in the finishing mold after the parison mold has obtained the charge for the complementary finishing mold.

6. In a glass blowing machine the combination with a continuously rotating carriage, of a series of parison mold heads supported thereby, a series of arms mounted on said carriage and adapted for swinging movement in an arcuate path in the direction of said parison molds, finish molds carried by said arms and movable in a separate concentric path in radially spaced relation with the parison mold path, a gathering zone in the parison mold path, means for charging the parison molds with molten glass in the said zone, a transfer station in the parison mold path, means for swinging the finish molds into register with the parison at the transfer station and for swinging the finish mold to an inner concentric path, and means for blowing the article to final form while travelling on said concentric path.

7. In a glass blowing machine the combination with a continuously rotating carriage, of a series of parison mold heads supported thereby, a series of arms mounted on said carriage and adapted for swinging movement in an arcuate path in the direction of said parison molds, finish molds carried by said arms and movable in a separate concentric path in radially spaced relation with the parison mold path, a gathering zone in the parison mold path, means for charging the parison molds with molten glass in the said zone, a transfer station in the parison mold path, means for swinging the finish molds into register with the parison at the transfer station and for swinging the finish mold to an inner concentric path, means for closing the finishing molds at the transfer station, and means for blowing the article to final form while travelling on said concentric path.

8. In a glass forming machine, the combination with a rotating carriage, of a series of parison and neck mold heads supported thereby, a series of arms mounted on said carriage and adapted for movement in an arcuate path in the direction of said molds, finish molds carried by said arms and movable in a separate concentric path, a gathering zone in the parison mold path, a transfer station in the parison mold path, means for charging the parison and neck molds with molten glass at the said zone, a plunger adapted to form a cavity in the glass in said neck mold, means for withdrawing the plunger, means for admitting blowing air through the neck mold to the glass along the parison mold path, means for swinging the finish molds into register with the parison at the transfer station and for returning the finish mold to an inner concentric path, means for closing the finish mold about the parison while in register therewith, and separate means for blowing the article to final form while travelling on said concentric path.

9. In a glass forming machine of the rotary suction type, the combination which includes, a stationary support, a rotary carriage, a plurality of dipping frames mounted on said carriage, parison molds carried by the frames, a vertical shaft mounted between the carriage and the frames, means on the carriage for actuating the shaft during the rotation of the machine to open and close the parison molds and means for adjusting the elevation of the frames along said shaft to adapt the frames to receive parison molds of variable lengths and maintain the mold opening and closing movements independent of the elevation of said molds on the machine.

10. In a glass forming machine of the rotary suction type, a head for supporting neck molds and parison molds, an air cylinder over said molds, a piston operating in the cylinder, a source of pneumatic fluid pressure for operating the piston a shaft connected to said piston and having a plunger on the lower end adapted for vertical reciprocation into and out of the neck molds, and means controlled by the rotation of the machine to admit fluid pressure to the cylinder to reciprocate the plunger.

11. In a glass forming machine of the suction type, the combination which comprises, a rotary carriage, a plurality of swinging arms mounted on the carriage, finish molds carried by the arms, a lever mounted on the axis of the said arms, and means controlled by the rotation of the carriage for actuating the levers to close the molds and separate means actuating the levers to open the molds.

12. In a glass machine of the suction type, the combination which comprises a rotary carriage, a plurality of parison molds mounted on the carriage to move in a closed circular path, means for filling the molds to make a parison, a plurality of swinging arms mounted on an axis independent of the carriage axis, finish molds carried by the arms, levers mounted on the said axis adapted for movement with the movements of said arms, means for swinging the finish molds while opened into register with the parison and subsequently returning the arms, and means controlled by the rotation of the machine for actuating the levers to close the finish molds to enclose the parison in the parison mold path and separate means actuating the levers to open the finish molds after they are returned to their first position by the movement of the arms.

WILLIAM A. MORTON.